Figure 1:
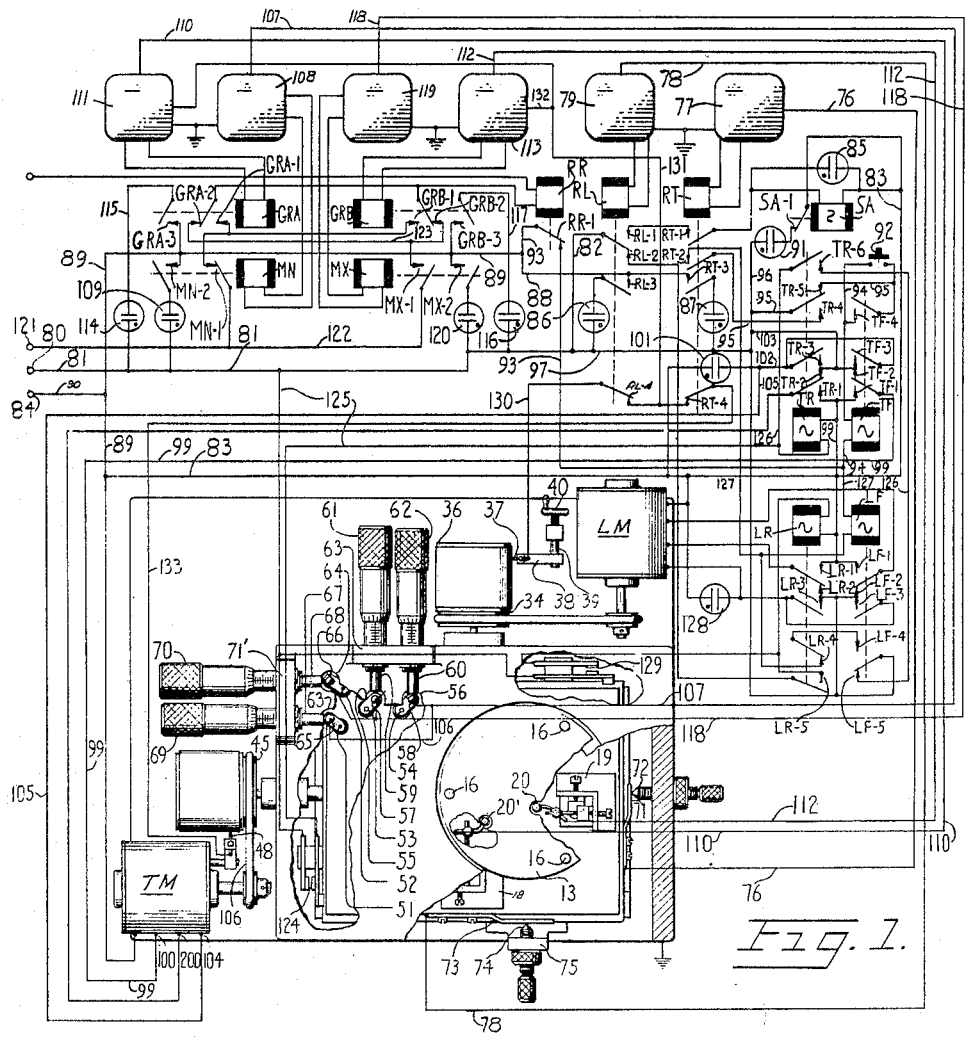

Dec. 28, 1954 W. S. TANDLER 2,697,880
HOLE CENTER DISTANCE GAUGE
Filed Aug. 9, 1949

Inventor
William S Tandler
By Campbell, Brumbaugh, Free & Graves
Attorneys

United States Patent Office 2,697,880
Patented Dec. 28, 1954

2,697,880

HOLE CENTER DISTANCE GAUGE

William S. Tandler, New York, N. Y., assignor, by mesne assignments, to The Warner & Swasey Research Corporation, Cleveland, Ohio, a corporation of Ohio Application August 9, 1949, Serial No. 109,316

14 Claims. (Cl. 33—174)

The present invention relates to gauges and more specifically to new and improved gauging apparatus for gauging, in a novel and highly effective manner, the distance between the center of a hole formed in a part and a reference location which may be the center of another hole, for example.

The conventional methods employed heretofore for gauging the distance from a reference location to the center of a hole formed in a part have not been entirely satisfactory. For one thing, they are slow and time consuming, and often not accurate enough to meet the exacting requirements in some fields such as watch making, for example. Further, no prior gauging method or apparatus suitable for commercial operations could indicate whether or not the center of a hole in a part is within tolerance limits and at the same time indicate the direction and magnitude of any deviation from the dimensions specified for the hole center.

It is an object of the present invention, accordingly, to provide new and improved hole center distance gauging apparatus which is free from the above noted deficiencies of the prior art.

Another object of the invention is to provide new and improved gauging apparatus of the above character which is capable of providing accurate indications of the direction and magnitude of any deviation of the center of a hole in a part from a specified location in a simple and rapid manner.

A further object of the invention is to provide new and improved gauging apparatus of the above character by means of which an accurate record of the distance between a hole center and a reference location may be obtained.

These and other objects of the invention are attained by providing first probe means insertable within a hole formed in a part and mounted for relative movement with respect to the part so as to bring it into engagement with the wall of the hole in the part. Second probe means is mounted for relative movement with respect to stop means in synchronism with the relative movement between the first probe means and the part, so as to bring the second probe means and the stop means into engagement. The second probe means and the stop means are adapted to come into engagement when the first probe means reaches a position corresponding to a specified maximum or minimum value for the hole center distance.

Preferably, third probe means and second stop means are mounted for relative movement with the second probe means and its stop means, the two sets of probe means being adapted to come into engagement with their respective stop means when the first probe means reaches positions corresponding to specified minimum and maximum values, respectively, for the hole center distance.

Upon engagement of the first probe means with the wall of the hole in the part, first indicating means is initiated. Second and third indicating means are also initiated upon engagement of the second and third probe means, respectively, with the corresponding stop means. By noting the order in which the indicating means are initiated, it is a relatively simple matter to determine whether the center distance for the hole lies inside or outside the specified tolerances.

Preferably, mechanism similar to that described above is provided for gauging the distance from the hole center to another location, the line through the hole center and the location being at an angle of, say, 90° to the line along which the first hole center distance is gauged.

In order to obtain a record of the hole center distance from one of the reference locations, relative movement is produced between recording means and a record strip, in synchronism with the relative movement between the probe means in the hole in the test part, and the recording means is caused to record on the record strip at the instant of engagement of the probe means with the wall of the hole. It will be seen that the relative movement between the recording means and the record strip up to the instant the record is made, is a measure of the desired hole center distance.

Figure 2:
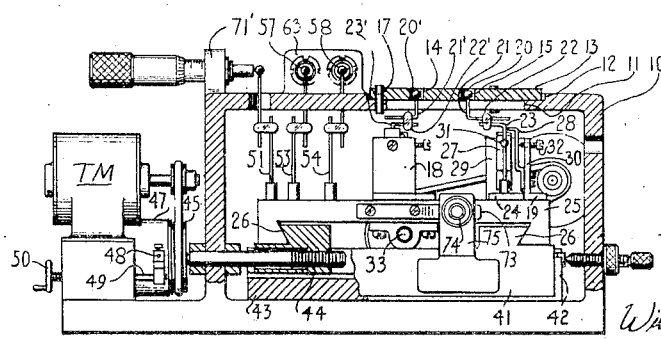

The invention may be better understood from the following detailed description of a typical form thereof, taken in conjunction with the accompanying drawings, in which:

Fig. 1 is a schematic diagram of gauging apparatus constructed according to the invention; and Fig. 2 is a view in elevation, partly in section, of the probe carriage assembly and associated elements in the apparatus shown in Fig. 1.

While the gauging apparatus to which this application is addressed can be utilized for a wide variety of different gauging purposes, it will be described herein, by way of example, as applied to the gauging of holes in a so-called "watch plate" used in the manufacture of watch assemblies.

Referring now to Figs. 1 and 2, the gauging apparatus may comprise, for example, a housing 10 having an aperture 11 formed in the upper wall thereof communicating with a recess 12 of greater diameter which is adapted to serve as a seat for a watch plate 13 or the like. Formed in the watch plate 13 are a plurality of holes 14 and 15 whose center distances with respect to a reference location or locations are to be determined. A plurality of positioning holes 16 are also formed about the periphery of the plate 13 within which positioning pins 17 secured in the upper wall of the housing 10 are adapted to be received.

The holes 14 and 15 in the plate 13 are adapted to be gauged, according to the invention, by means of a pair of probe assemblies 18 and 19, respectively. The probe assemblies 18 and 19 are identical in construction and it will be necessary, therefore, to describe only one in detail, corresponding parts of the other being designated by corresponding primed reference numerals.

The probe assembly 19 (Fig. 2) comprises a probe element 20 which may be spherical in shape, although other shapes may be employed. The probe element 20 is mounted on a narrow resilient rod 21 supported by a bead 22 of glass or other suitable insulating material carried by a thicker resilient supporting member 23. The supporting member 23 is carried by a base 24 secured on a carriage 25 which is mounted on guide members 26 for longitudinal sliding movement in a direction perpendicular to the paper.

Limited adjustment of the probe element 20 in mutually perpendicular directions may be effected by the resilient members 27 and 28 which are secured upon the brackets 29 and 30, respectively, and which are adapted to be positioned by adjusting screws 31 and 32, respectively, as shown.

Movement of the carriage 25 on the guides 26 may be effected by any suitable means, such as a lead screw 33 on which is mounted a pulley 34 (Fig. 1) which may be belt driven from a suitable motor LM. The pulley 34 may also carry a drum 36 on which may be mounted a record strip such as Teledeltos paper, for example, on which a record is adapted to be made by a stylus 37, as will be described in greater detail hereinafter. The stylus 37 may be mounted on an arm 38 carried by a lead screw 39 which may be advanced longitudinally of the axis of the drum 36 by a hand-wheel 40, for example.

The guides 26 on which the carriage 25 slides are formed on a second carriage 41 (Fig. 2) which is slidably mounted for transverse movement on guide member 42 formed on a base 43 secured at the bottom of the housing 10.

The carriage 41 may be moved perpendicularly to the movement of the carriage 25 by means of a lead screw 44 on which is mounted a pulley 45 belt driven by a suitable motor TM. The pulley 45 carries a drum 47 on which may be mounted a record strip such as Teledeltos paper, for example, which is adapted to be engaged by a stylus 48. The stylus 48 may be mounted on a lead screw 49 which is adapted to be advanced longitudinally of the drum 47 by a hand wheel 50, for example.

The longitudinal carriage 25 also supports a plurality of fixed probe members 51, 52, 53 and 54. The probe members 53 and 54 extend through apertures 55 and 56, respectively, formed in the upper wall of the housing 10 and are provided with probe elements 57 and 58, respectively, which are adapted to engage the spindles 59 and 60, respectively, of adjustable micrometer barrels 61 and 62, respectively, which are mounted in a bracket 63 secured to the upper wall of the housing 10.

In a similar fashion, the probe members 51 and 52 extend through apertures 63 and 64, respectively, formed in the upper wall of the housing 10 and they are provided with probe elements 65 and 66, respectively, which are adapted to engage the spindles 67 and 68, respectively, of micrometer probe barrels 69 and 70 respectively. The micrometer probe barrels 69 and 70 are mounted in a bracket 71' which is secured to the upper wall of the housing 10.

One way to line the machine up prior to initiation of operation, is to substitute a so-called "sub-master" plate for the plate 13. A sub-master plate is one in which the centers of the holes 14 and 15 are known to be accurately positioned. With the carriage 25 at a position towards the rear of the housing 10, the probe elements 20 and 20' are adjusted by means of the adjusting screws 31 and 31' until they just engage the rearmost portions of the walls of the holes 14 and 15, respectively, in the plate 13. The micrometer barrels 61 and 62 are then adjusted until they just engage the probes 57 and 58, respectively. The micrometer barrel 61 is then backed off an amount equal to the maximum tolerance specified for the hole center distance while the micrometer barrel 62 is advanced a distance equal to the minimum tolerance specified for the hole center distance.

In similar fashion, the probe elements 20 and 20' are adjusted by the adjusting screws 32 and 32' with the carriage 41 in a position towards the left of the housing 10 in Fig. 2 until they just engage the left-hand portions of the walls of the holes 14 and 15, respectively. Also, the micrometer barrels 69 and 70 are adjusted so that their spindles 67 and 68, respectively, just engage the probe elements 65 and 66. The micrometer barrel 70 is then backed off an amount equal to the maximum tolerance specified for the hole center distances, while the micrometer probe 69 is advanced an amount equal to the minimum tolerance specified for the hole center distances.

In operation, the sub-master plate is removed and a plate 13 to be gauged is substituted therefor. The longitudinal carriage 25 is then moved forwardly (Fig. 2), to bring the several probe elements into engagement with the piece or with one of the micrometer spindles as the case may be. If the centers of the holes 14 and 15 are within the tolerances specified for the longitudinal direction of movement of the carriage 25, it will be understood that the probe element 58 will engage the spindle 60 before either of the probes 20 or 20' engages the walls of the holes 14 and 15 and that the probe element 57 will engage the micrometer spindle 59 after the probe elements 20 and 20' have engaged the walls of the holes 14 and 15.

The longitudinal carriage 25 is then returned to its initial position and the transverse carriage 41 is moved towards the left to bring the probe elements into engagement with the piece 13 and with the micrometer spindles respectively. Here again, if the center distances of the holes 14 and 15 for the transverse direction of movement of the carriage 41 are within the tolerances specified, the probe element 65 will engage the micrometer spindle 67 before either of the probe elements 20 or 20' engage the walls of the holes 14 and 15 in the plate 13, while the probe element 66 will engage the micrometer spindle 68 after the probe elements 20 and 20' have engaged the walls of the holes 14 and 15.

It will be readily understood, therefore, that by observing the order of engagement of the probe elements 20 and 20' with the walls of the holes 14 and 15 and of the probe elements 57, 58, 65 and 66 with their respective micrometer spindles 59, 60, 67 and 68, it is a relatively simple matter to determine whether or not the center of the holes 14 and 15 lie inside or outside of the specified tolerances.

In the form of the invention shown in the figures, the several probes are moved automatically and the engagement of any of the probe elements with the wall of a hole in the plate 13, or with a micrometer spindle, as the case may be, is caused to actuate indicating means. In order to facilitate an understanding of the control system by means of which the operation is effected, a typical operating cycle will be traced out in detail below.

In the normal starting position, the carriages 25 and 41 are in their rearmost positions so that an insulated contact 71 on the carriage 41 engages an adjustable contact 72 mounted in the side wall of the housing 10, while an insulated contact 73 on the carriage 25 engages an adjustable fixed contact 74 mounted on a bracket 75 secured to the bottom of the housing 10.

With the contacts 71 and 72 engaged, a circuit is completed through a conductor 76 to one terminal of a conventional D. C. amplifier 77, the other terminal of which is connected to ground, the contact 72 also being grounded through the housing 10. Similarly, with the contacts 73 and 74 in engagement, a circuit is completed through a conductor 78 to one terminal of a second D. C. amplifier 79, the other terminal of which is connected to ground, the contact 74 also being grounded through the housing 10. Hence, when the power is turned on, the D. C. amplifiers 77 and 79 energize the transverse reset relay RT and the longitudinal reset relay RL, respectively, closing the contacts RT–1, RT–2, RT–3, RL–3 and RL–1 and opening the contacts RL–2, RL–4 and RT–4.

The closing of contacts RL–1 and RT–1 completes a circuit which is traced from the mains terminal 80 through the conductors 81 and 82, closed contacts RL1 and RT–1, the accept signal relay SA and the conductors 83, 89 and 90 to the other mains terminal 84. This energizes the accept signal relay SA and simultaneously illuminates the accept signal light 85 which is connected in parallel therewith.

The closing of the contacts RL–3 and RT–3 connect the longitudinal reset light 86 and the transverse reset light 87, respectively, through the conductors 88, 89 and 90 to the mains terminal 84, so that these two signal lights are illuminated.

Upon energization of the accept signal relay SA, the contacts SA–1 are opened, thus disconnecting the reject signal light 91 from the conductor 83, so that it is off.

Operation of the gauging apparatus is initiated by depressing the start button 92. This completes a circuit which is traced from the mains terminal 84 through the conductors 90, 89, 93, normally closed contacts RR–1 of the reject relay RR, a conductor 94, the transverse forward relay TF, closed start button 92, a conductor 95, normally closed contacts TR–5 on transverse reverse relay TR, and the conductors 96, 97 and 81 to the mains terminal 80, thus energizing the transverse forward relay TF. Energization of the transverse relay TF closes its contacts TF–4, TF–3 and TF–4 and opens its contacts TF–2.

The closing of the contacts TF–4 bypasses the start button 92 so that the relay TF remains energized after the start button 92 is released.

The closing of the contacts TF–1 completes a circuit which is traced from the mains terminal 84 through the conductors 90, 89, 83, 99 and the closed contacts TF–1 to one terminal 100 of the transverse motor TM. Since the contacts TR–2 of the deenergized transverse reverse relay are closed, it will be noted that the other mains terminal 80 is connected to another terminal 200 of the motor TM so that one of the coils of the latter is now energized for rotation in the forward direction.

Simultaneously, the closing of the contacts TF–3 connects the motor No. 1 signal light 101 through the conductors 102 and 103 to the conductor 97 so that the light 101 is illuminated.

The closing of the contacts TF–3 also connects the terminal 104 of the motor TM to the conductor 97 through the conductors 105 and 103 so that the other coil of the motor TM is energized. Both coils of the motor TM being energized, the motor rotates and drives the carriage 41 in the forward transverse direction through the belt 106, the pulley 45 and the lead screw 44.

As soon as the carriage 41 begins its movement, the contact 71 thereon disengages the fixed contact 72, thus deenergizing the amplifier 77 and with it the transverse reset relay RT. This opens the contacts RT–1, RT–2 and RT–3 so that the transverse reset light 87 is off and the accept signal relay SA is deenergized. Simultaneously the contacts KT–4 are opened.

Upon deenergization of the accept signal relay SA, the contacts SA-1 are closed so that the reject signal light 91 is turned on.

Assuming that the center distances of the holes 14 and 15 lie within the maximum and minimum tolerance for which the micrometer barrels 69 and 70 are set, continued movement of the carriage 41 will cause the minimum tolerance probe element 65 to engage the micrometer spindle 67 first. This completes a circuit through the conductors 106 and 107 to one terminal of a conventional D. C. amplifier 108, the other terminal of which is connected to ground, the micrometer spindle 67 also being grounded through the housing 10. This energizes the minimum tolerance relay MN closing its contact MN-2 and opening its contact MN-1.

The closing of the contacts MN-2 completes a circuit between the minimum tolerance signal light 109 and the supply mains terminals 80 and 84, through the conductors 81, 89 and 90, so that the light 109 is on.

The opening of the contacts MN-1 breaks the connection between the positive terminal 121 of a source of voltage (not shown) and the contacts GRA-1 and GRB-1 of the relays GRA and GRB, respectively, so that the reject relay RR will not be energized when the relays GRA and GRB are subsequently energized.

As transverse movement of the carriage 41 continues, the probe elements 20 and 20' engage the left-hand sides of the walls of the holes 15 and 14, respectively, in the watch plate 13. Upon engagement of the probe element 20' with the watch plate 13, a circuit is completed through a conductor 110 to one terminal of a conventional D. C. amplifier 111, the other terminal of which is connected to ground, the circuit being completed through the housing 10 which is grounded. This energizes the gauging relay GRA, closing its contacts GRA-3 and GRA-1 and opening its contacts GRA-2.

Similarly, engagement of the probe element 20 with the watch plate 13 completes a circuit through a conductor 112 to one terminal of a conventional D. C. amplifier 113, the other terminal of which is grounded. This energizes the gauging relay GRB, causing its contacts GRB-1 and GRB-3 to close and its contacts GRB-2 to open.

The closing of the contacts GRA-3 connects the probe A signal light 114 to the supply mains terminals 80 and 84 through the conductors 90, 89, 115 and 81, so that the probe A signal light 114 is turned on.

Similarly, the closing of the contacts GRB-3 connects the probe B signal light 116 to the supply mains terminals 80 and 84 through the conductors 81, 117, 89 and 90, so that it too is turned on.

Further movement of the carriage 41 in the transverse direction brings the maximum tolerance probe element 66 into engagement with the micrometer spindle 68, completing a circuit through the conductor 118 to one terminal of a conventional D. C. amplifier 119, the other terminal of which is grounded, the spindle 68 also being grounded through the housing 10. This energizes the maximum tolerance relay MX and closes both its contacts MX-1 and MX-2.

The closing of the contacts MX-2 connects the maximum tolerance signal light 120 to the supply mains terminals 80 and 84 through the conductors 81, 89 and 90 so that it is on.

It will be noted that although the closing of the contacts MX-1 connects the pulse terminal 121 of a source of direct current through a conductor 122 to the conductor 123, the reject relay RR is still not energized, since the contacts GRA-2 and GRB-2 of the energized relays GRA and GRB, respectively, are open.

Transverse movement of the carriage 41 continues until the carriage 41 engages and closes a switch 124 which is mounted on the support 43. The closing of the switch 124 completes a circuit which is traced from the supply mains terminal 80 through the conductors 81 and 125, the closed contacts 124, a conductor 126, the winding of transverse reverse relay TR and the conductors 99, 83, 89 and 90 to the supply mains terminal 84. This energizes the transverse reverse relay TR, closing its contacts TR-1, TR-3, TR-4 and TR-6 and opening its contacts TR-2 and TR-5.

The closing of the contacts TR-6 connects the conductor 126 to the conductor 97 through the closed contacts LF-5 of the deenergized longitudinal forward relay LF, thus maintaining the transverse relay TR energized, after the switch 124 is opened.

The opening of the contacts TR-5 breaks the circuit to the transverse forward relay TF so that the latter is deenergized, opening its contacts TF-1, TF-3 and TF-4 and closing its contacts TF-2.

Since the contacts TR-1 and TF-2 are now closed, the connections between the terminals 200 and 100 of the transverse motor TM and the supply mains terminals 80 and 84 respectively are reversed so that the motor TM begins to rotate in the reverse direction and move the carriage 41 to its initial position.

As the carriage 41 continues in motion in the reverse direction, the contacts between the probes 65, 66, 20 and 20' are broken in their reverse sequences from that in which the contacts were made. Thus, the maximum tolerance relay MX, the gauging relays GRB and GRA and the minimum tolerance relay MN are deenergized in that order and the reject relay RR is not energized.

When the carriage 41 reaches the normal starting position, the contact 71 thereon engages the fixed contacts 72 completing the circuit to the amplifier 77 and energizing the transverse reset relay RT. Since the contact 73 on the carriage 25 is at this time also in engagement with its cooperating contact 74, the circuit to the longitudinal reset amplifier 77 is closed and the longitudinal reset relay RL is energized. Therefore, the accept signal light 85 goes on and the reject signal light 91 goes off.

Upon energization of the transverse reverse relay RT, the contact RT-2 is closed. This completes a circuit which is traced from the supply mains terminal 80 through the conductors 81, 97, 96 and 95, the closed contacts TR-4 of transverse reverse relay TR, the closed contacts RT-2, the conductor 127, the winding of longitudinal forward relay LF, the conductor 93, closed contacts RR-1 of relay RR and the conductors 89 and 90 to the supply mains terminal 84.

Energization of the longitudinal forward relay LF closes its contacts LF-1, LF-3 and LF-4 and opens its contacts LF-2 and LF-5. The closing of the contacts LF-1 and LF-3 starts the longitudinal motor LM in the forward direction, the contact LR-2 being normally closed. The closing of the contact LF-3 also causes the motor No. 2 signal light 128 to be turned on.

Rotation of the longitudinal motor LM causes the carriage 25 to advance in the forward direction. As soon as the contact 73 on the carriage 25 disengages the fixed contact 74, the circuit to the D. C. amplifier 79 is broken so that the longitudinal reset relay RL is deenergized. This causes the longitudinal reset signal light 86 to go off, the accept signal light to go off and the reject signal light 91 to go on.

In respect to the probe elements 20, 20', 57 and 58, the action in the longitudinal direction is essentially the same as that in the transverse direction and it need not be repeated here. As the carriage 25 reaches the end of its longitudinal travel, it closes a switch 129 mounted on the housing 10 which closes a circuit energizing the longitudinal reverse relay LR. Its holding contact LR-4 closes and holds the relay coil energized because the contact 73 on the carriage 25 is not in engagement with the fixed contact 74 and the contact RL-2 on the deenergized longitudinal reset relay RL is closed. The motor LM now reverses its direction of rotation, the contacts LR-1, LF-2 and LR-3 being closed and the contacts LF-1, LR-2 and LF-3 being open. The motor No. 2 signal light 128 remains on and the longitudinal reset signal light 86 remains off.

When the carriage 25 returns again to its normal starting position, the contact 73 engages the fixed contact 74, completing the circuit to the amplifier 79 and energizing the longitudinal reset relay RL. This causes the accept signal light 85 to go on and the reject signal light to go off. Both the longitudinal and transverse reset signal lights 87 and 86, respectively, are off and the No. 1 and No. 2 motor signal lights 101 and 128 are off.

When the normal contacting sequence, outlined above, of the tolerance probes and the gauging probes is not followed the reject relay RR is energized. This occurs whenever the minimum tolerance relay MN is energized after either of the gauging relays GRA and GRB or the maximum tolerance relay MX is energized before either of the relays GRA and GRB. This would occur on the forward motion of either the longitudinal motor LM or the transverse motor TM.

Energization of the relay RR opens its contact RR–1, deenergizing the transverse forward relay TF or the longitudinal forward relay LF, as the case may be, and causing the appropriate motor then in operation to stop. The corresponding reset signal light 87 or 86 will then be off and will indicate in which direction the piece was incorrect. By observing the several probe lights 114 and 116, it can be seen which of the holes 14 and 15 in the watch plate 13 is not within the tolerance limits and on which side it is off. The piece is then rejected.

Upon completion of the transverse and longitudinal gauging operations described above, the control system may be reset to its initial condition either manually or by any suitable auxiliary control system (not shown).

The recording drums 36 and 47 enable permanent records of the measurements to be obtained, if desired. To this end, the stylus 37 which engages the Teledeltos paper on the drum 36 is connected through a conductor 130, the normally closed contacts RL–4 on the longitudinal reset relay RL, and the conductors 131 and 132 to the output of the D. C. amplifier 113 which provides a pulse when the probe 20 engages the watch plate 13. The conductor 131 is also connected to receive the output of the amplifier 111 which produces a pulse when the probe element 20' engages the watch plate 13. It will be understood, therefore, that during longitudinal movement of the carriage 25, the distance between the starting point on the Teledeltos paper on the drum 36 and the point where a record is made by the stylus 37 will be a measure of the distance from a reference location to the centers of the holes 14 and 15.

In similar fashion, the stylus 48 which engages the Teledeltos paper on the drum 47 is connected through a conductor 133 and the closed contacts RT–4 on the relay RT to the conductor 131. Hence, during transverse movement of the carriage 41, the distance from the starting point on the Teledeltos paper on the drum 47 to the point where records are made by the stylus 48 is a measure of the distance from a second reference location to the centers of the holes 14 and 15. After records have been made corresponding to one part, the styli 37 and 48 may be moved longitudinally of the drums 36 and 47 by manipulation of the hand-wheels 40 and 50, respectively, and the several records may be identified by suitable markings placed on the Teledeltos record strips.

It will be understood from the foregoing that the invention provides a highly effective gauging apparatus for determining whether or not the distances between the centers of holes formed in a plate and a reference point are within specified tolerances. By utilizing resilient probes to engage the piece to be gauged, accurate measurements can be obtained without damaging the piece in any way. Further, by virtue of the novel control system disclosed herein, it is possible to determine in which direction the holes in the piece are off, and records can be made of the distances between a reference point and the centers of holes formed in the piece, if desired.

The specific embodiment described above by way of example is obviously susceptible of numerous changes in form and detail within the spirit of the invention. For example, the probe elements shown in the accompanying drawings need not be spherical but may be formed in other shapes with good results. Probe elements having a shape formed by placing two shallow cones with their bases in contact would be entirely suitable for the purpose. Other modifications will be readily apparent to those skilled in the art. The specific embodiment disclosed herein, therefore, is not to be regarded as imposing any restrictions whatsoever upon the scope of the following claims.

I claim:

1. Hole center distance gauging apparatus comprising means for accurately supporting in a predetermined position a part having a hole therein, probe means adapted to extend into said hole in the part, means for producing in automatic sequence first and second mutually inclined relative movements between said probe means and the part to bring the probe means into engagement with the wall of the hole at a different place for each movement, means respectively responsive to relative displacement between said probe means and the part resulting from each relative movement for indicating in the corresponding relative movement when said probe means is at a predetermined relative position with respect to a reference datum, and indicating means rendered operative in each relative movement upon engagement of said probe means with the wall of the hole, said indicating means and said means responsive to relative displacement being constructed and arranged to be individually operative during each gauging operation and to afford, cooperatively, indications respectively derived from said two relative movements of dimensional conditions of the part.

2. Hole center distance gauging apparatus comprising means for accurately supporting in a predetermined position a part having a hole therein, probe means adapted to extend into said hole in the part, means for producing in automatic sequence first and second mutually inclined relative movements between said probe means and the part to bring the probe means into engagement with the wall of the hole at a different place for each movement, means respectively responsive to each resulting relative displacement between said probe means and the part for indicating in the corresponding relative movement when said probe means is at a predetermined relative position with respect to a reference datum corresponding to one limiting tolerance for the center distance of said hole, means responsive to each relative displacement for indicating in the corresponding relative movement when said probe means reaches a different predetermined relative position with respect to said reference datum corresponding to another limiting tolerance for the center distance of said hole, and indicating means rendered operative in each relative movement upon engagement of said probe means with the wall of the hole, said indicating means and said means responsive to relative displacement being constructed and arranged to be individually operative during each gauging operation and to afford, cooperatively, indications respectively derived from said two relative movements of dimensional conditions of the part.

3. Hole center distance gauging apparatus comprising means for accurately supporting in a predetermined position a part having a hole therein, probe means adapted to extend into said hole in the part, means for producing in automatic sequence first and second mutually inclined relative movements between said probe means and the part to bring the probe means into engagement with the wall of the hole at a different place for each movement, means respectively responsive to each resulting relative displacement between said probe means and the part for indicating in the corresponding relative movement when said probe means is at a predetermined relative position with respect to a reference datum corresponding to one limiting tolerance for the center distance of said hole, means responsive to each relative displacement for indicating in the corresponding relative movement when said probe means reaches a different predetermined relative position with respect to said reference datum corresponding to another limiting tolerance for the center distance of said hole, indicating means rendered operative in each relative movement upon engagement of said probe means with the wall of the hole at a position between said two predetermined positions, and different indicating means rendered operative in each relative movement upon engagement of said probe means with the wall of the hole at a position outside of said two predetermined positions.

4. Hole center distance gauging apparatus comprising means for accurately supporting in a predetermined position a part having a hole therein, probe means adapted to extend into said hole in the part, means for producing in automatic sequence first and second mutually inclined relative movements between said probe means and the part to bring the probe means into engagement with the wall of the hole at a different place for each movement, means respectively responsive to each relative displacement between said probe means and the part for indicating in the corresponding relative movement when said probe means is at a predetermined relative position with respect to a reference datum corresponding to one limiting tolerance for the center distance of said hole, means responsive to each relative displacement for indicating in the corresponding relative movement when said probe means reaches a different predetermined relative position with respect to said reference datum corresponding to another limiting tolerance for the center distance of said hole, indicating means rendered operative in each relative movement upon engagement of said probe means with the wall of the hole at a position between said two predetermined positions, different indicating means rendered operative in each relative movement upon engagement of said probe means with the wall of the hole at a position outside of said two predetermined positions, and control means also rendered operative in each relative movement upon engagement of said probe means with the wall of the hole at said outside position for discontinuing any further relative movement between the probe means and the part.

5. Hole center distance gauging apparatus comprising means for accurately supporting in a predetermined position a part having a hole therein, probe means adapted to extend into said hole in the part, means for producing relative movement between said probe means and the part in one direction to bring the probe means into engagement with one part of the wall of the hole and for returning the probe means to an initial position, means responsive to relative displacement between said probe means and the part for indicating when said probe means reaches a predetermined relative position with respect to a reference datum corresponding to one limiting dimension for the center location of said hole, indicating means rendered operative upon engagement of said probe means with said one part of the wall of the hole during said relative movement, control means rendered operative upon the arrival of said probe means at its initial position for producing relative movement between said probe means and the part in another direction inclined with respect to the first named direction to bring the probe means into engagement with another part of the wall of the hole and for returning the probe means to said initial position, means responsive to the relative displacement between said probe means and the part in said another direction for indicating when said probe means reaches another predetermined position with respect to another reference datum corresponding to another limiting dimension for the center location of said hole, and indicating means rendered operative upon engagement of the probe means with said another part of the wall of the hole during the movement in said another direction.

6. Hole center distance gauging apparatus comprising means for accurately supporting in a predetermined position a part having a hole therein, probe means adapted to extend into a hole in a part, means for producing relative movement between said probe means and the part in one direction to bring the probe means into engagement with one part of the wall of the bore hole and for returning the probe means to an initial position, means responsive to relative displacement between said probe means and the part in said one direction for indicating when said probe means reaches a predetermined position with respect to a reference datum corresponding to one limiting dimension for the center distance of said hole, second means responsive to the relative displacement in said one direction for indicating when said probe means reaches a second predetermined position with respect to said reference datum corresponding to another limiting dimension for the center distance of said hole, indicating means rendered operative upon engagement of said probe means with said one part of the hole, control means rendered operative upon the return of said probe means to its initial position for producing relative movement between said probe means and the part in another direction inclined with respect to the first named direction to bring the probe means into engagement with another part of the wall of the hole and for returning the probe means to its initial position, first means responsive to relative displacement between said probe means and the part in said another direction for indicating when said probe means reaches a predetermined position with respect to another reference datum corresponding to a third limiting dimension for the center distance of said hole, second means responsive to the relative displacement in said another direction for indicating when said probe reaches another predetermined position with respect to said another reference datum corresponding to a fourth limiting dimension for the center distance of said hole, and indicating means responsive to engagement of the probe means with said another part of the bore hole.

7. Hole center distance gauging apparatus as in claim 6 together with indicating means responsive to engagement of the probe means with said one part or said another part of the hole outside of said predetermined limiting dimension positions, and control means also responsive to engagement of the probe means with said one part or said another part of the hole outside of said predetermined limiting dimensions for discontinuing relative movement between said probe means and the part.

8. Hole center distance gauging apparatus comprising a support for a part having a hole therein, probe means mounted at the position occupied by said hole when the part is on said support and adapted to extend into said hole, means for producing in automatic sequence first and second mutually inclined relative gauging movements between said probe means and said support to bring said probe means into engagement with the wall of said hole at a different place for each movement, stop means, second probe means, means for producing sequential relative movements between said second probe means and said stop means, in synchronism, respectively, with the relative movements between said first probe means and said support, to bring said stop means and said second probe means into engagement when, in a gauging movement, said first probe means and said support are at relative positions corresponding to a predetermined value for the distance between the center of said hole and a reference datum, indicating means responsive in each gauging movement to engagement of said first probe means and the wall of the hole, and second indicating means responsive in each gauging movement to engagement of said second probe means and said stop means.

9. Hole center distance gauging apparatus comprising a support for a part having a hole therein, probe means mounted at the position occupied by said hole when the part is on the support and adapted to extend into said hole, means for producing in automatic sequence first and second mutually inclined relative gauging movements between said probe means and said support to bring said probe means into engagement with the wall of said hole at a different place for each movement, first and second stop means, second and third probe means, means for producing sequential relative movements between said second probe means and said first stop means and also between said third probe means and second stop means in synchronism, respectively, with the relative movements between said first probe means and said support to bring said second and third probe means into engagement with said first and second stop means, respectively, when, in each gauging movement, said first probe means and said support are at relative positions corresponding to minimum and maximum distances, respectively, between the center of said hole and a reference datum, a plurality of indicating means responsive, respectively, to engagement in each gauging movement of said second and third probe means with their corresponding first and second stop means, and indicating means responsive in each gauging movement to engagement of said first probe means and the wall of said hole.

10. Hole center distance gauging apparatus comprising a support for a part having a hole therein, probe means mounted at the position occupied by said hole when the part is on the support and adapted to extend into said hole, means for producing in automatic sequence first and second mutually inclined relative gauging movements between said probe means and said support to bring said probe means into engagement with the wall of said hole at a different place for each movement, first and second stop means, second and third probe means, means for producing sequential relative movements between said second probe means and said first stop means and also between said third probe means and second stop means in synchronism, respectively, with the relative movements between said first probe means and said support to bring said second and third probe means into engagement with said first and second stop means, respectively, when, in each gauging movement, said first probe means and said support are at relative positions corresponding to minimum and maximum distances, respectively, between the center of said hole and a reference datum, a plurality of indicating means responsive, respectively, to engagement in each gauging movement, of said second and third probe means with their coresponding first and second stop means, indicating means responsive in each gauging movement to engagement of said first probe means and the wall of said hole at a position between the positions corresponding to said minimum and maximum center hole distances, and indicating means responsive in each gauging movement to engagement of said first probe means and the wall of said hole at a position outside of the positions corresponding to said minimum and maximum center hole distances.

11. Hole center distance gauging apparatus in accordance with claim 10 together with control means also responsive in each gauging movement to engagement of said first probe means and the wall of said hole at a position outside of the positions corresponding to said minimum and maximum center hole distances for discontinuing any further relative movement between the probe means and their respective stop means and the support.

12. Hole center distance gauging apparatus comprising a support for a part having a hole therein, a carriage mounted for to-and-fro movement in mutually perpendicular directions, probe means mounted on the carriage at the position occupied by said hole when the part is on said support and adapted to extend into said hole, a pair of stop means, a pair of probe elements mounted on said carriage so as to engage said respective stop means during movement of said carriage in one direction at relative positions of said probe means and the support corresponding to predetermined minimum and maximum hole center distance values, a second pair of stop means adapted to be engaged by said pair of probe elements, respectively, during movement of said carriage in a mutually perpendicular direction, at relative positions of said probe means and the support corresponding to other predetermined minimum and maximum hole center distance values, indicating means responsive to engagement of said probe elements with their respective stop means, indicating means responsive to engagement of said probe means with the wall of the hole during movement of said carriage in either of said mutually perpendicular directions at positions between the maximum and minimum hole center distance values for the respective directions, indicating means responsive to engagement of said probe means with the wall of the hole during movement of said carriage in either of said mutually perpendicular directions at positions outside of said maximum and minimum center hole distances for the respective directions, a plurality of motive means for moving said carriage successively in said mutually perpendicular directions, and control means also responsive to engagement of said probe means and the wall of the bore hole under the conditions last stated to deenergize the motive means then in operation to bring said carriage to rest.

13. Hole center distance gauging apparatus comprising probe means adapted to be inserted within a hole in a part to be gauged, means for intermittently producing in automatic sequence first and second mutually inclined relative movements between said probe means and the wall of the hole to bring the probe means into engagement with said wall at a different place for each movement, record strip means, recording means, means for producing respective relative movements between the record strip and said recording means in accordance with the relative movements between said probe means and the part, and control means responsive in each relative movement to engagement of said probe means with the wall of the hole for causing said recording means to make a record on said record strip means which represents the distance of the center of the hole from a reference datum, positionally fixed with respect to said part.

14. Hole center distance gauging apparatus comprising probe means adapted to be inserted in a hole in a part to be gauged, means for intermittently producing in automatic sequence first and second mutually inclined relative movements between said probe means and the wall of the hole at a different place for each movement to bring the probe means into engagement with said wall, means establishing in the course of each relative movement a predetermined relative position between said probe means and the part corresponding to a predetermined reference center hole distance taken with respect to said part, and means for indicating in each relative movement the relation between the relative position with respect to said part where the probe means comes into engagement with the wall of the hole and said predetermined relative position.

References Cited in the file of this patent

UNITED STATES PATENTS

| Number | Name | Date |
|---|---|---|
| 713,784 | Mellor | Mar. 18, 1902 |
| 992,460 | Updegraff | May 16, 1911 |
| 992,926 | Updegraff | May 23, 1911 |
| 1,112,699 | Houston | Oct. 6, 1914 |
| 2,239,981 | Terry | Apr. 29, 1941 |
| 2,281,960 | Vacquier | May 5, 1942 |
| 2,305,816 | Sannberger | Dec. 22, 1942 |
| 2,382,885 | Landay | Aug. 14, 1945 |
| 2,388,582 | Sorensen | Nov. 6, 1945 |
| 2,495,797 | Whitlock | Jan. 31, 1950 |
| 2,502,775 | Brandon | Apr. 4, 1950 |
| 2,533,606 | Natzke | Dec. 12, 1950 |

FOREIGN PATENTS

| Number | Country | Date |
|---|---|---|
| 571,751 | Germany | Mar. 9, 1933 |
| 594,395 | Great Britain | Mar. 11, 1947 |